US 6,536,955 B2

(12) United States Patent
Ohbayashi et al.

(10) Patent No.: US 6,536,955 B2
(45) Date of Patent: Mar. 25, 2003

(54) OPTICAL CONNECTOR

(75) Inventors: Yoshiaki Ohbayashi, Nara (JP); Hiroshi Nakagawa, Kyoto (JP)

(73) Assignee: Hosiden Corporation (JP)

( * ) Notice: Subject to any disclaimer, the term of this patent is extended or adjusted under 35 U.S.C. 154(b) by 0 days.

(21) Appl. No.: 09/759,276

(22) Filed: Jan. 16, 2001

(65) Prior Publication Data

US 2001/0009598 A1 Jul. 26, 2001

(30) Foreign Application Priority Data

Jan. 20, 2000 (JP) ........................................ 2000-011596

(51) Int. Cl.$^7$ ................................................. G02B 6/36
(52) U.S. Cl. ......................................... 385/78; 439/135
(58) Field of Search ............................... 385/78, 77, 92, 385/94; 439/142, 135

(56) References Cited

U.S. PATENT DOCUMENTS 5,506,922 A * 4/1996 Grois et al. ................... 385/75
5,679,013 A * 10/1997 Matsunaga et al. ......... 439/144
5,687,268 A * 11/1997 Stephenson et al. .......... 385/73
6,041,155 A * 3/2000 Anderson et al. ........... 385/139

FOREIGN PATENT DOCUMENTS

| JP | 4-109706 U | 9/1992 |
| JP | 11-283690 A | 10/1999 |
| JP | 2000-304972 A | 11/2000 |

* cited by examiner

Primary Examiner—Lynn D. Feild
Assistant Examiner—Brian S. Webb
(74) Attorney, Agent, or Firm—Griffin & Szipl, P.C.

(57) ABSTRACT

The invention relates to an optical connector which is used in the field of the optical communication. As a counter optical connector 100 for the optical connector, a plug of the square or round type is used. In the optical connector, a cover 30 is attached in an openable and closable manner to the body 10 having a fitting hole portion 17 into which the counter optical connector 100 is to be inserted. The fitting hole portion 17 is formed by an internal space which is surrounded by a cylindrical wall 15 disposed in the body 10. The cover 30 has a covering wall portion 31 which is fittable to and detachable from an outside of the body 10. The optical connector performs functions that, even when the counter optical connector 100 is wrenched during an inserting or extracting operation, the wrenching force is not transmitted to the cover, and that the external appearance can be changed only by changing the design of the cover.

2 Claims, 6 Drawing Sheets

OPTICAL CONNECTOR

BACKGROUND OF THE INVENTION

1. Field of the Invention

The present invention relates to an optical connector. The optical connector of the invention is used in the field of the optical communication. As a counter optical connector for the optical connector of the invention, a plug of the square or round type is used. In the optical connector of the invention, a countermeasure against a case where a counter optical connector is wrenched during an inserting or extracting operation is taken. Furthermore, also a countermeasure for dust-proof in a case where the optical connector is not used is taken. In the optical connector of the invention, consideration for the external design and the decoration effect is given.

2. Description of the Prior Art

Japanese Patent Publication Laying-Open No. 11-283690 describes a female optical connector. In the optical connector, the body is formed into a rectangular cylindrical shape. The internal space of the rectangular cylindrical body is formed as a fitting hole portion into which a protruding portion formed on a counter optical connector (male optical connector) is to be inserted. The protruding portion of the counter optical connector forms an optical path end. An optical element is mounted on a rear end portion of the body so as to be opposed to the protruding portion which is fitted into the fitting hole portion of the body.

By contrast, Japanese Utility Model Publication Laying-Open No. 4-109706 describes a male optical connector. The optical connector comprises a shutter which opens and closes the front side of the protruding portion.

On the other hand, the assignee of the present invention has proposed in Japanese Patent Application No. 11-114147 a female optical connector in which a cover is attached in an openable and closable manner to a base on which an optical element is mounted, and a counter optical connector that is set in a predetermined position on the base is clamped by the base and the cover. The optical connector has a structure which can be easily thinned and miniaturized, and hence can be suitably used in an electric apparatus of the portable or stationary type, for example, a digital audio apparatus such as an MD player, a CD player, a DVD player, or an STB (a BS tuner or a CS tuner).

However, it has been noted that the optical connector having the structure in which the counter optical connector is clamped by the base and the cover has the following fear. When the counter optical connector is wrenched during an operation of setting the counter optical connector onto the base or extracting it from the base, the wrenching force is transmitted to the cover so that the cover is sometimes broken. Also, it has been noted that the fear is serious particularly in a thin or small optical connector of specifications suitable to a digital audio apparatus such as those mentioned above including an MD player, a CD player, a DVD player, or an STB (a BS tuner or a CS tuner).

SUMMARY OF THE INVENTION

The present invention has been conducted under the above circumstances.

It is an object of the invention to provide an optical connector which, even when a counter optical connector is wrenched during an inserting or extracting operation, is free from a fear that the wrenching force is transmitted to a cover and the cover is broken.

It is another object of the invention to provide an optical connector in which a countermeasure for dust-proof during nonuse is taken.

It is a further object of the invention to provide an optical connector in which the external appearance can be changed only by changing the design of a cover.

It is a still further object of the invention to provide an optical connector in which an illumination effect can be exerted by using leaking light.

The optical connector of the invention includes: a body having a fitting hole portion into which a protruding portion of a counter optical connector forming an optical path end is to be inserted; a cylindrical wall which is formed in the body, the fitting hole portion being formed by an internal space which is surrounded by the wall; an optical element which is mounted on the body to be opposed to the protruding portion that is fitted into the fitting hole portion; and a cover which opens and closes an insertion/extraction port that is formed in a front end of the fitting hole portion.

In the optical connector, when the cover is opened and the protruding portion of the counter optical connector is inserted into the fitting hole portion of the body, the optical path end formed by the protruding portion is opposed to the optical element mounted on the body, whereby an optical path is formed therebetween. The body has the cylindrical wall and the internal space surrounded by the cylindrical wall is formed as the fitting hole portion. Even when the counter optical connector is wrenched during an operation of inserting or extracting the counter optical connector into or from the fitting hole portion, therefore, the wrenching force is received by the cylindrical wall, and hence the wrenching force is not transmitted to the cover.

Preferably, the cover comprises: a covering wall portion which is fittable to and detachable from an outside of the body; and a cover main portion which is disposed in a front end of the covering wall portion, and which is extractable and retractable with respect to a front side of the insertion/extraction port, and a rear end portion of the covering wall portion is rotatably attached to a lateral shaft which is disposed in a rear end portion of the body.

According to this configuration, when the cover is closed, the body is covered with the covering wall portion of the cover. Therefore, the external appearance of the optical connector can be changed only by changing the design of the cover. Even in the case where optical connectors of different designs are requested, therefore, it is required only that the design of the cover is changed while commonly using the body of the same shape. When the cover is closed, the cover main portion protrudes in front of the insertion/extraction port, and hence dusts are prevented from entering the inside through the insertion/extraction port.

In the optical connector of the invention, preferably, a projection is disposed in a front side with respect to the lateral shaft, and on each of the body and the cover, the projections are fitted into oblong holes which are formed in end portions of a link, respectively, and, when the cover is opened at a maximum opening angle, the projections disposed on the body or the cover are engaged with hole edges of the oblong holes formed in the link, respectively.

The optical connector of the invention may be configured so that the body and the cover are made of a light transmitting material which is transparent or translucent. According to this configuration, light leaking from the transparent or translucent body and cover exerts an illumination effect. Therefore, for example, characters or a figure drawn on the cover are seen as if they are embossed.

As described above, in the optical connector of the invention, there is no fear that, even when a counter optical connector is wrenched during an inserting or extracting operation, the cover is broken. During nonuse, dust-proof is sufficiently performed. The design can be changed easily and economically. Moreover, an illumination effect can be exerted by using leaking light. A further effect that the opening/closing state of the cover can be easily known is attained.

Other specific features and effects of the invention will be more apparent from the following description of embodiments.

DETAILED DESCRIPTION OF THE PREFERRED EMBODIMENT

Hereinafter, a preferred embodiment will be described.

Figure 1:
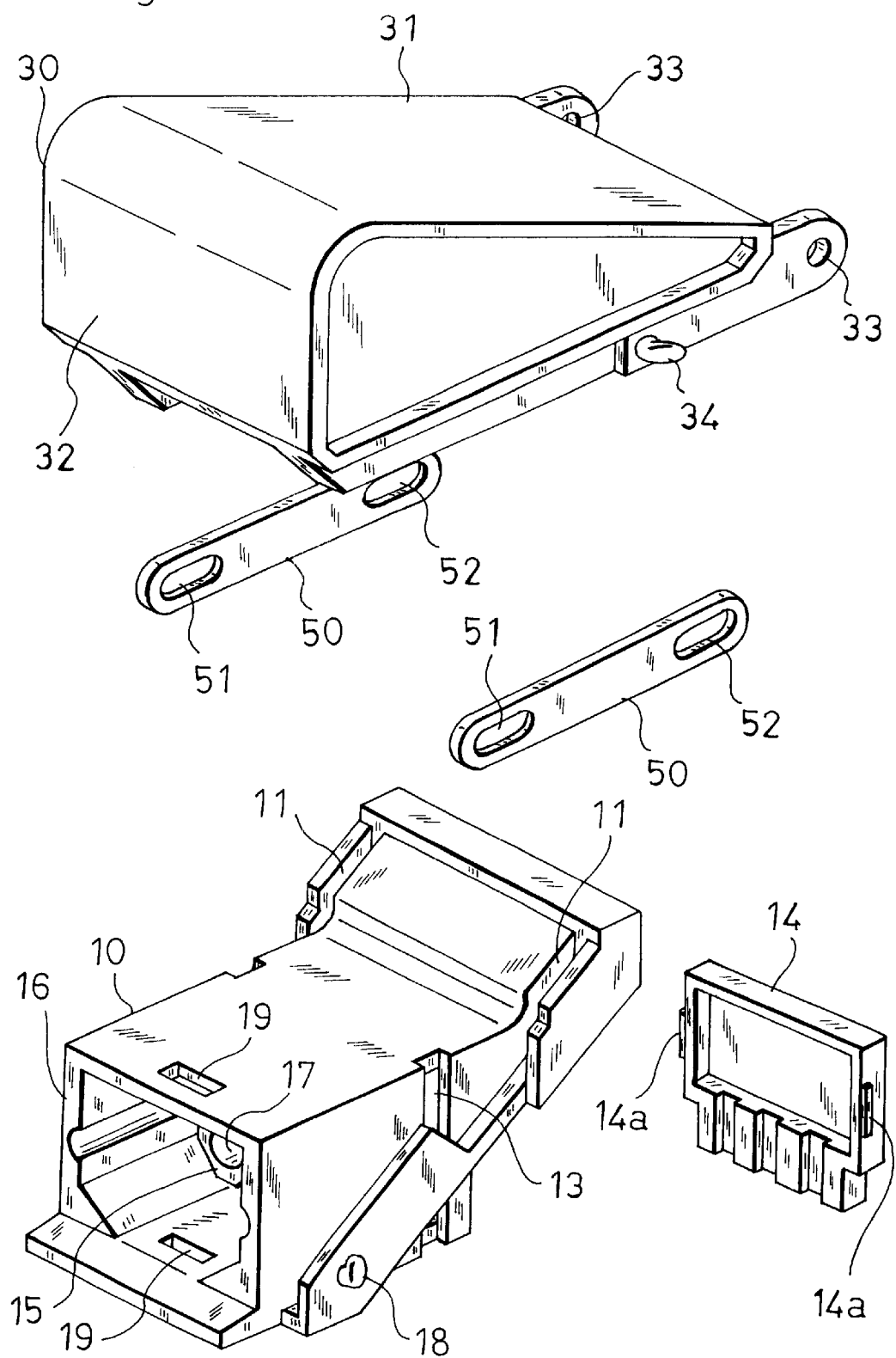
FIG. 1 is a diagrammatic exploded perspective view of an optical connector of an embodiment of the invention.

As shown in FIG. 1, an optical connector comprises the body 10 configured by a synthetic resin molded product, a cover 30 configured by a synthetic resin molded product, and links 50 which extend over the body 10 and the cover 30, and which are coupled to the body and the cover so as to be relatively swingable. A rectangular plug shown in FIG. 6 can be used as a counter optical connector 100 for the optical connector.

Figure 6:
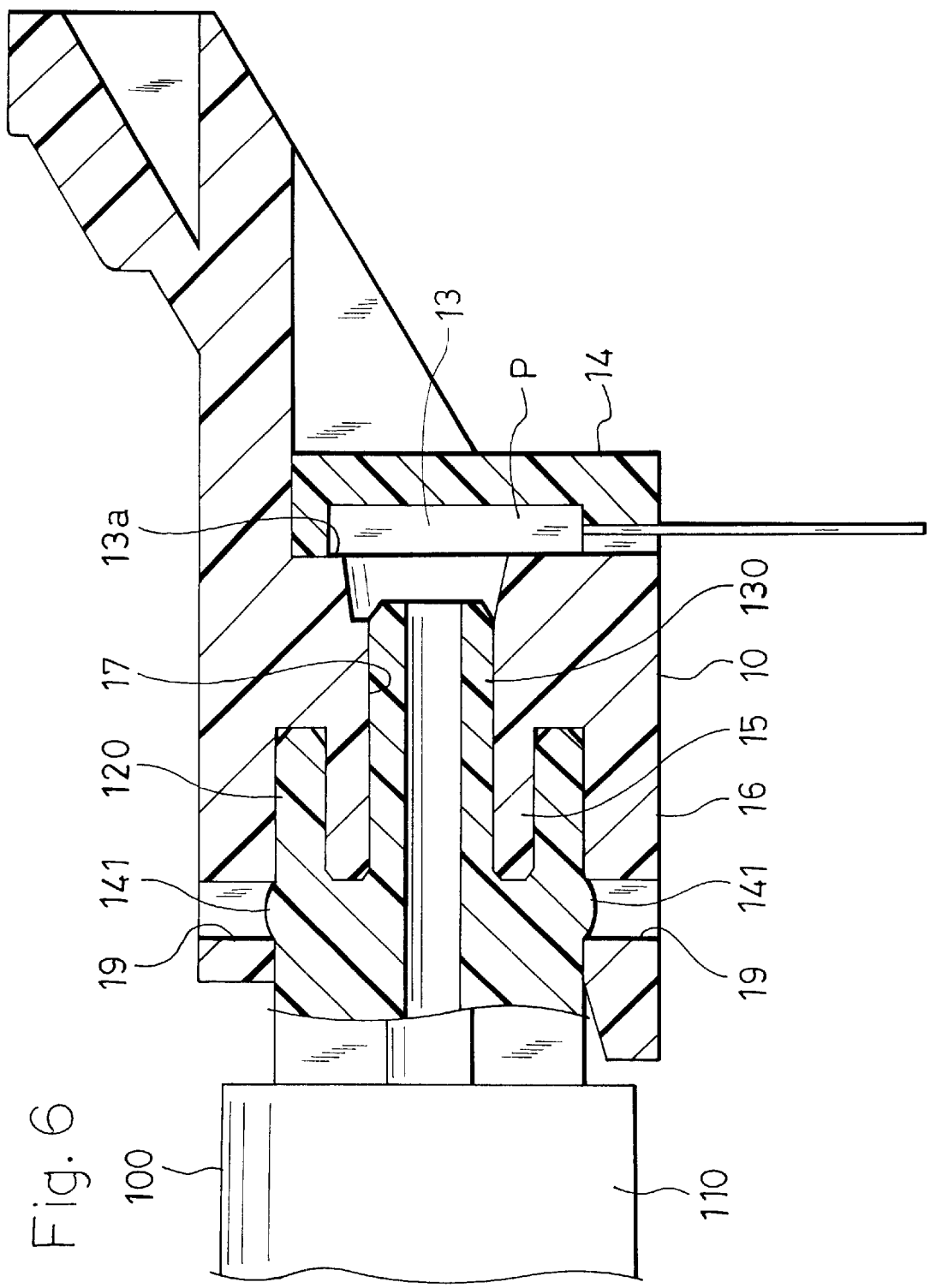
FIG. 6 is a longitudinal side section view of main portions in a state where a counter optical connector is connected to the optical connector.

As shown in FIG. 6, the counter optical connector 100 comprises the body 110 which has a polygonal shape in a front view, an external cylindrical portion 120 which protrudes from the body 110, and which has a polygonal shape in a front view, and a protruding portion 130 which protrudes from the external cylindrical portion 120, and which has a circular shape in a front view. An optical path end is formed by the protruding portion 130. Engaging projections 141 which have an arcuate shape in a side view are formed on the upper and lower faces of the external cylindrical portion 120, respectively.

Next, the structures of the body 10, the cover 30, and the links 50 will be described in detail.

As shown in FIG. 1, a recess 11 is formed in each of two or right and left places of a rear end portion of the body 10. As shown by the broken lines in FIGS. 2 and 3, a lateral shaft 12 protrudes from one side wall face of each of the recesses 11. A mounting portion 13 is formed in the rear end portion of the body 10. As shown in FIG. 6, an optical element P is mounted in the mounting portion 13. In the illustrated example, as seen from FIG. 6, the rectangular optical element P is attached to the rear end portion of the body 10 by clamping the element between a receiving face 13a of the mounting portion 13, and a pressing plate 14 which is engagingly attached to the mounting portion 13. As shown in FIG. 1, a projection 14a is formed on each of right and left side faces of the pressing plate 14. The projections 14a are pressed into recesses (not shown) which are formed in the mounting portion 13, whereby the pressing plate 14 is held by the mounting portion 13. The structure for mounting the optical element P is not restricted to the illustrated example. For example, the optical element P may be bonded to the rear end portion of the body by an adhesive agent.

The body 10 is provided with a cylindrical wall 15, and a rectangular outer wall 16 surrounding the cylindrical wall 15. The internal space surrounded by the cylindrical wall 15 is formed as a fitting hole portion 17 into which the protruding portion 130 of the counter optical connector 100 is to be inserted. The fitting hole portion 17 is useful for positioning the optical path end formed by the protruding portion 130 of the counter optical connector 100, with respect to the optical element P mounted on the mounting portion 13. A projection 18 which serves as a laterally projecting support shaft is formed in each of two or right and left places of a front end portion of the body 10. Engaging recesses 19 are formed in upper and lower portions of the outer wall 16 of the body 10, respectively. The engaging projections 141 of the counter optical connector 100 are to be engaged with the engaging recesses 19.

The cover 30 comprises: a covering wall portion 31 which is fittable to and detachable from the outside of the body 10; and a cover main portion 32 which is disposed in a front end of the covering wall portion 31, and which is extractable and retractable with respect to a front side of an insertion/extraction port 17a. Right and left hole portions 33 which are disposed in a rear end portion of the covering wall portion 31 are rotatably attached to the lateral shaft 12 of the body 10. A projection 34 is formed in each of right and left positions of the covering wall portion 31 which are more forward than the hole portions 33.

Figure 2:
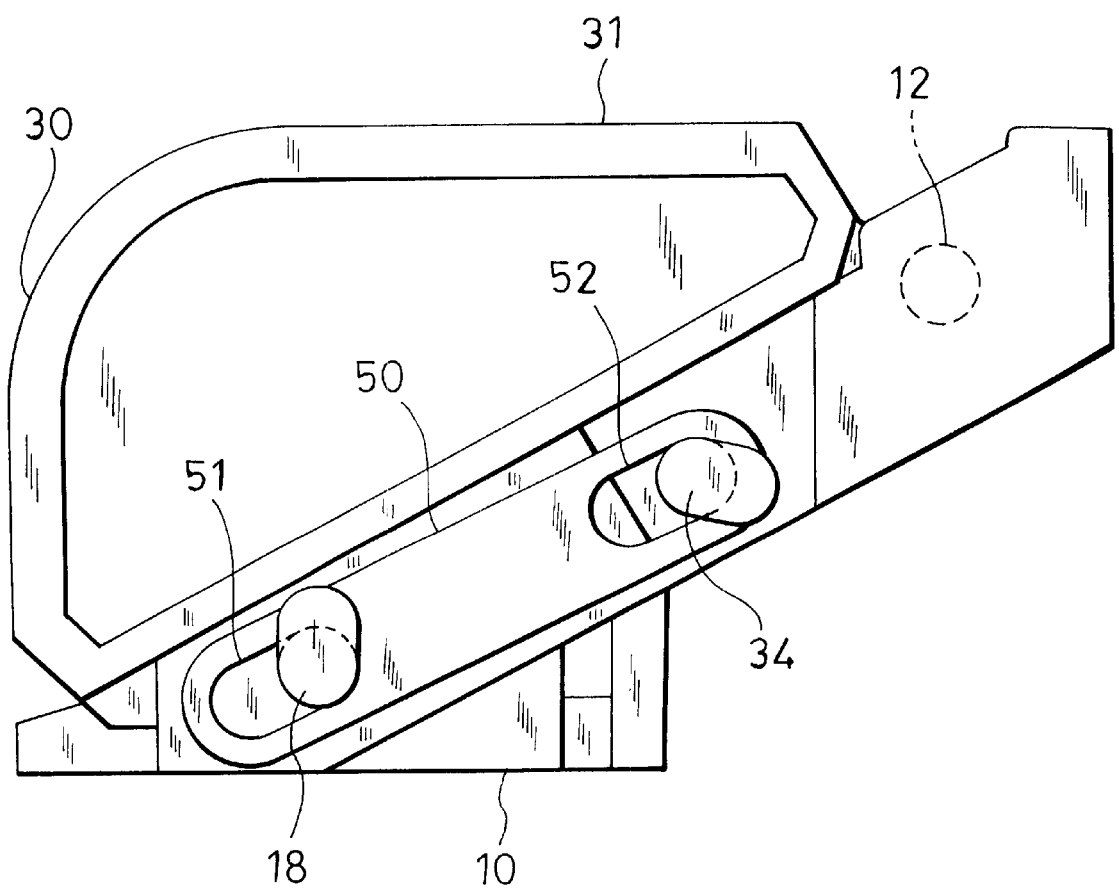
FIG. 2 is a diagrammatic side view of a state where a cover of the optical connector is closed.
Figure 3:
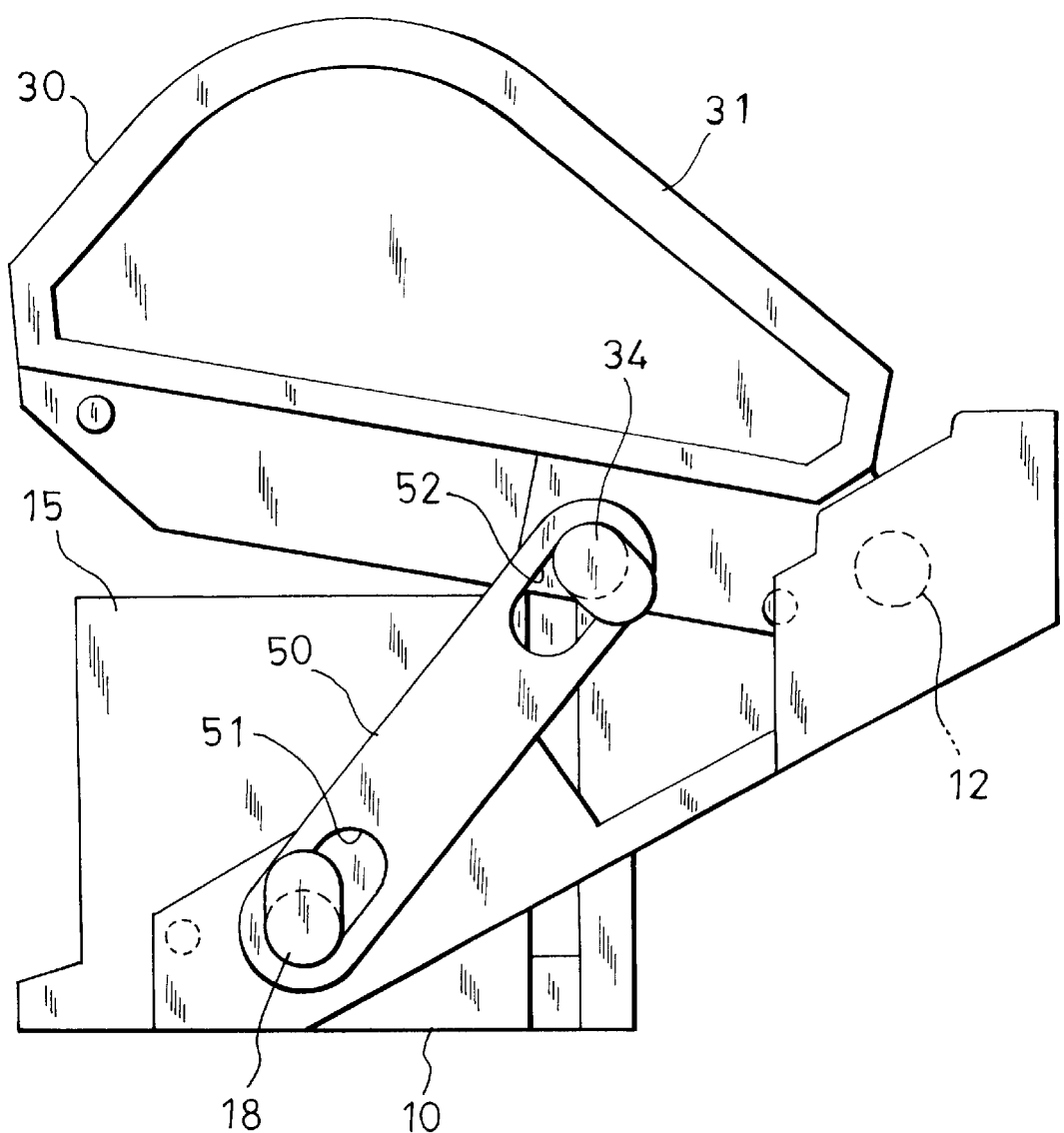
FIG. 3 is a diagrammatic side view of a state where the cover of the optical connector is opened.

As shown in FIG. 1, each of the links 50 has oblong holes 51 and 52 which are respectively formed in end portions of the link, and which elongate in the longitudinal direction of the link 50. As shown in FIGS. 2 and 3, the respective one of the projections 18 of the body 10 is fitted into the one oblong hole 51 of the link 50, and the respective one of the projections 34 of the cover 30 is fitted into the other oblong hole 52 of the link 50. The links 50 are respectively disposed on both the sides of the body 10 and the cover 30 so as to extend over them.

The cover 30 which is attached to the body 10 in the manner described above is vertically openable and closable about the lateral shaft 12 of the body 10. When the cover 30 is closed, as indicated by the phantom lines in FIG. 5, the cover main portion 32 of the cover 30 is placed so as to protrude with respect to the front side of the insertion/extraction port 17a which is formed by the front end opening of the fitting hole portion 17 of the body 10, and the covering wall portion 31 of the cover 30 covers the upper face and the right and left side faces of the body 10. Therefore, the cover 30 prevents dusts from entering the fitting hole portion 17.

On the other hand, the maximum opening angle of the cover 30 is restricted by the link 50, and the projections 18 of the body 10 and the projections 34 of the cover 30. Specifically, when the cover 30 is opened at the maximum opening angle about the lateral shaft 12 of the body 10, as indicated by the solid lines in FIG. 3 or 5, both the projections 18 and 34 of the body 10 and the cover 30 are respectively engaged with hole edges of the oblong holes 51 and 52 of the links 50 which are placed more forward than the lateral shaft 12. Therefore, the cover 30 cannot be opened at a larger angle.

Figure 5:
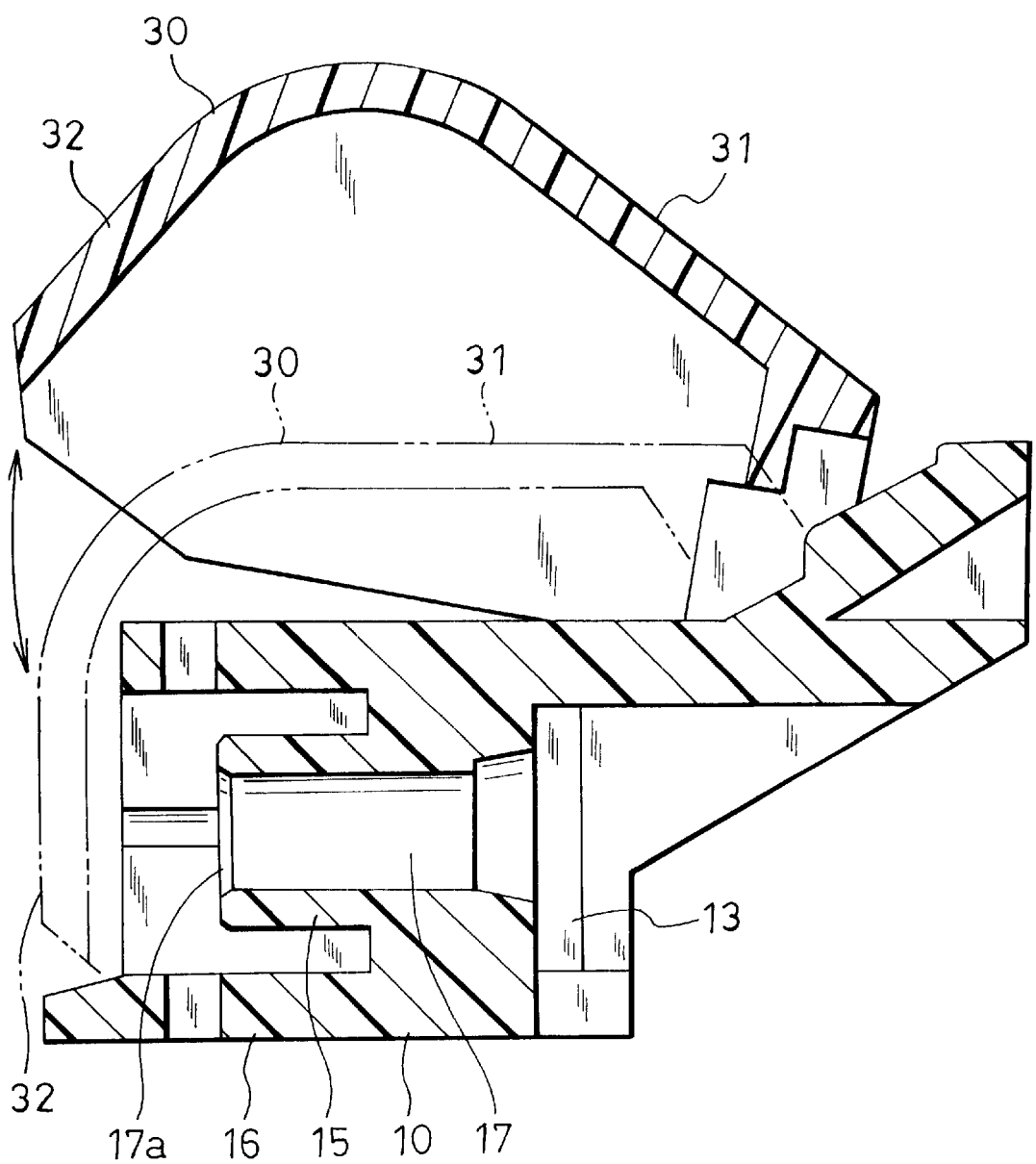
FIG. 5 is a diagrammatic longitudinal side section view of a state where the cover of the optical connector is opened.

In the optical connector described above, when the cover 30 is opened at the maximum opening angle as indicated by the solid lines in FIG. 3 or 5 and the external cylindrical portion 120 of the counter optical connector 100 is inserted into the body 10 as shown in FIG. 6, the external cylindrical portion 120 is held by the outer wall 16 of the body 10 in a state where the optical connector does not largely rattle, the protruding portion 130 of the counter optical connector 100 and forming the optical path end is inserted into the fitting hole portion 17 of the body 10, and the optical path is formed with being positioned with respect to the optical element P. At the same time, the upper and lower engaging projections 141 of the external cylindrical portion 120 are fitted into the upper and lower engaging recesses 19 of the body 10 to be engaged therewith. Therefore, the counter optical connector 100 is set into the body 10 so as to be stationary, and prevented from being accidentally disengaged from the body 10. When the upper and lower engaging projections 141 of the external cylindrical portion 120 are fitted into the engaging recesses 19 of the body 10, a sensation of an appropriate degree is transmitted to the hand, and hence ease of use of the optical connector is excellent.

The body 10 has the cylindrical wall 15 and the outer wall 16, the protruding portion 130 of the counter optical connector 100 is inserted into the fitting hole portion 17 which is formed by the internal space of the cylindrical wall 15, and the external cylindrical portion 120 of the counter optical connector 100 is inserted into the inner space surrounded by the outer wall 16. Even when the counter optical connector 100 is wrenched during an operation of inserting or extracting the counter optical connector 100, therefore, the wrenching force is received by the cylindrical wall 15 and the outer wall 16, and hence the wrenching force is not transmitted to the cover 30. Consequently, there is no possibility that, even when the counter optical connector 100 is wrenched, the cover 30 is broken. During nonuse, dust-proof is performed by the cover 30 which closes the fitting hole portion 17.

When the cover 30 is closed, the body 10 is externally covered with the covering wall portion 31 of the cover 30. When the design of the cover 30 is changed, therefore, the external appearance of the optical connector is changed. If, as in the illustrated example, the portion of the cover 30 connecting the covering wall portion 31 with the cover main portion 32 has a round shape, for example, the optical connector is provided with a round appearance when the cover 30 is closed. If, although not illustrated, the portion of the cover 30 connecting the covering wall portion 31 with the cover main portion 32 has an angular shape, the optical connector is provided with an angular appearance when the cover 30 is closed. Even in the case where optical connectors of different designs are requested, therefore, it is required only that the design of the cover 30 is changed while commonly using the body 10 of the same shape.

Figure 4:
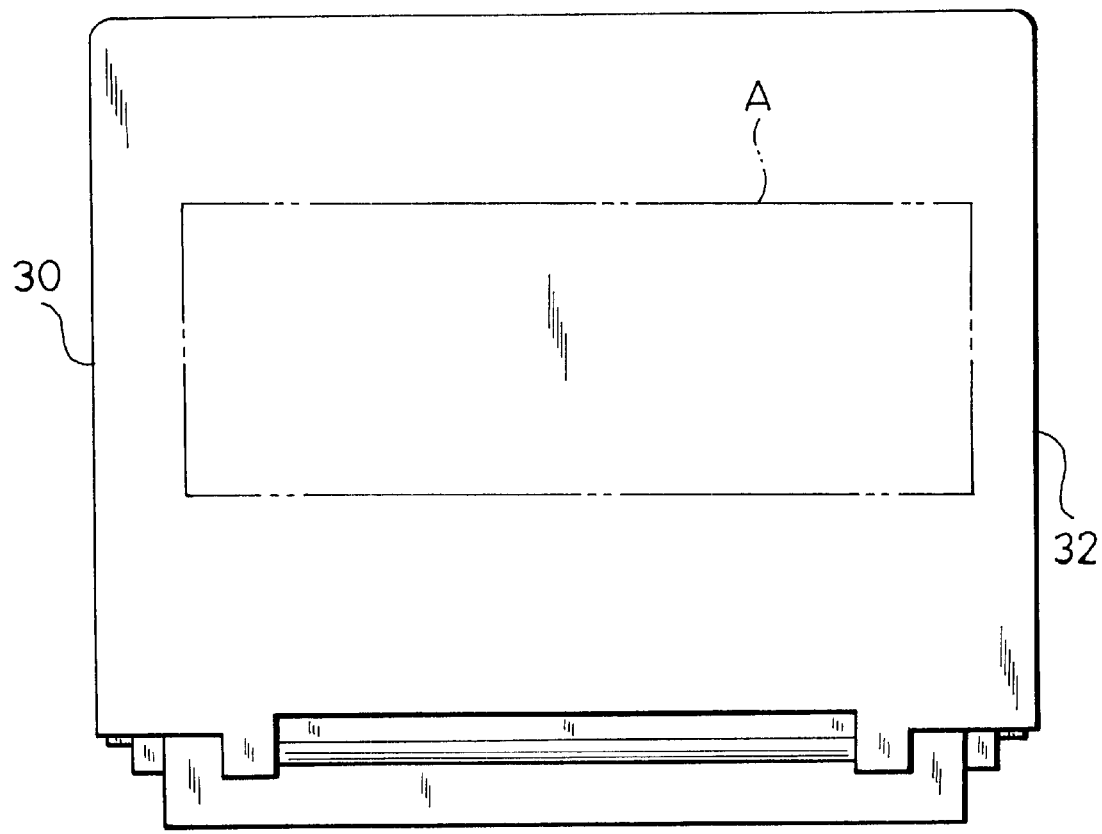
FIG. 4 is a front view of the optical connector and illustrating a case where the connector is configured so as to exert an illumination effect.

In the optical connector, the body 10 and the cover 30 may be made of a light transmitting material which is transparent or translucent. According to this configuration, light leaking from the transparent or translucent body 10 and cover 30 exerts an illumination effect. Therefore, when characters, a figure, or a pattern are formed in a predetermined region A of the cover main portion 32 of the cover 30 as shown in FIG. 4, for example, leaking light causes the display of such characters or the like to be seen as if they are embossed, thereby exerting an illumination effect.

The entire disclosure of Japanese Patent Application No. 2000-011596 filed on Jan. 20, 2000 including specification, claims, drawings and summary are incorporated herein by reference in its entirety.

What is claimed is:

1. An optical connector comprising:
   (a) a body having a fitting hole portion into which a protruding portion of a counter optical connector forming an optical path is to be inserted;
   (b) a cylindrical wall formed in the body, wherein the fitting hole portion is formed by an internal space surrounded by the cylindrical wall;
   (c) an optical element mounted on the body, wherein the optical element is opposed to the protruding portion that fits into the fitting hole portion; and
   (d) a cover mounted on the body to open and close an insertion/extraction port formed in a front end of the fitting hole portion, wherein the cover comprises:
     (i) a covering wall portion that fits to, and is detachable from, an outside of the body; and
     (ii) a cover main portion disposed in a front end of the covering wall portion, wherein the cover main portion is extractable and retractable with respect to a front side of the insertion/extraction port, and a rear end portion of the covering wall portion is rotatably attached to a lateral shaft disposed in a rear end portion of the body,
   wherein a projection is disposed on a front side, with respect to the lateral shaft, on each of the body and the cover, each projection being fitted into a corresponding oblong hole formed in an end portion of a link so that when the cover is opened at a maximum opening angle, each projection engages with hole edges of the corresponding oblong hole formed in the link.

2. An optical connector according to claim 1, wherein said body and said cover are made of a light transmitting material which is transparent or translucent.

* * * * *